United States Patent
Gorski

[11] Patent Number: 5,956,100
[45] Date of Patent: Sep. 21, 1999

[54] BACKGROUND LIGHT SHIELD FOR A VIDEO DISPLAY

[76] Inventor: Jim Gorski, 1919 Florida St., Huntington Beach, Calif. 92648

[21] Appl. No.: 09/134,989

[22] Filed: Aug. 17, 1998

[51] Int. Cl.[6] .................................................. H04N 5/64
[52] U.S. Cl. ............................................ 348/842; 359/609
[58] Field of Search ............................ 348/842; 359/601, 359/608, 609

[56] References Cited

U.S. PATENT DOCUMENTS

| | | | |
|---|---|---|---|
| 2,431,830 | 12/1947 | Rose | 348/842 |
| 2,627,067 | 1/1953 | Rose | 348/842 |
| 3,592,529 | 7/1971 | Juhlin . | |
| 3,827,795 | 8/1974 | Hinds . | |
| 3,849,598 | 11/1974 | Hoffberger, II et al. | 348/842 |
| 4,121,303 | 10/1978 | Reece . | |
| 4,297,693 | 10/1981 | Parsons . | |
| 4,314,280 | 2/1982 | Rose | 348/842 |
| 4,444,465 | 4/1984 | Giulie et al. | 359/601 |
| 4,633,324 | 12/1986 | Giulie . | |
| 4,863,242 | 9/1989 | Correa | 348/842 X |
| 4,897,802 | 1/1990 | Atkinson et al. . | |
| 5,069,529 | 12/1991 | Takahashi | 348/842 X |
| 5,204,750 | 4/1993 | Ferraroni | 359/609 X |
| 5,237,453 | 8/1993 | Jones | 348/842 X |
| 5,274,501 | 12/1993 | Stroll, Jr. | 359/609 X |
| 5,485,226 | 1/1996 | Chipperfield . | |
| 5,543,870 | 8/1996 | Blanchard . | |
| 5,589,985 | 12/1996 | Heller et al. | 348/842 X |
| 5,754,259 | 5/1998 | Nakamatsu et al. | 359/609 X |

FOREIGN PATENT DOCUMENTS 406059112  3/1994  Japan ..................................... 359/601

*Primary Examiner*—Peter M. Cuomo
*Assistant Examiner*—David E. Allred
*Attorney, Agent, or Firm*—Dennis W. Beech

[57] ABSTRACT

The background light shield has multiple generally rectangular panel elements which slide one relative to the other to adjust for attachment around a video display cabinet. The panel elements would normally be constructed of thin metal or other suitable material to hold their shape when attached to the video display cabinet to form a broad frame. The background light shield when attached forms a frame approximately parallel to the plane of the video screen of the video display and may be attached at the front of the cabinet to be substantially in the plane of the video screen. The background light shield is of dark color, such as black, and of rough texture for low reflectivity and contrast with the video display.

11 Claims, 1 Drawing Sheet

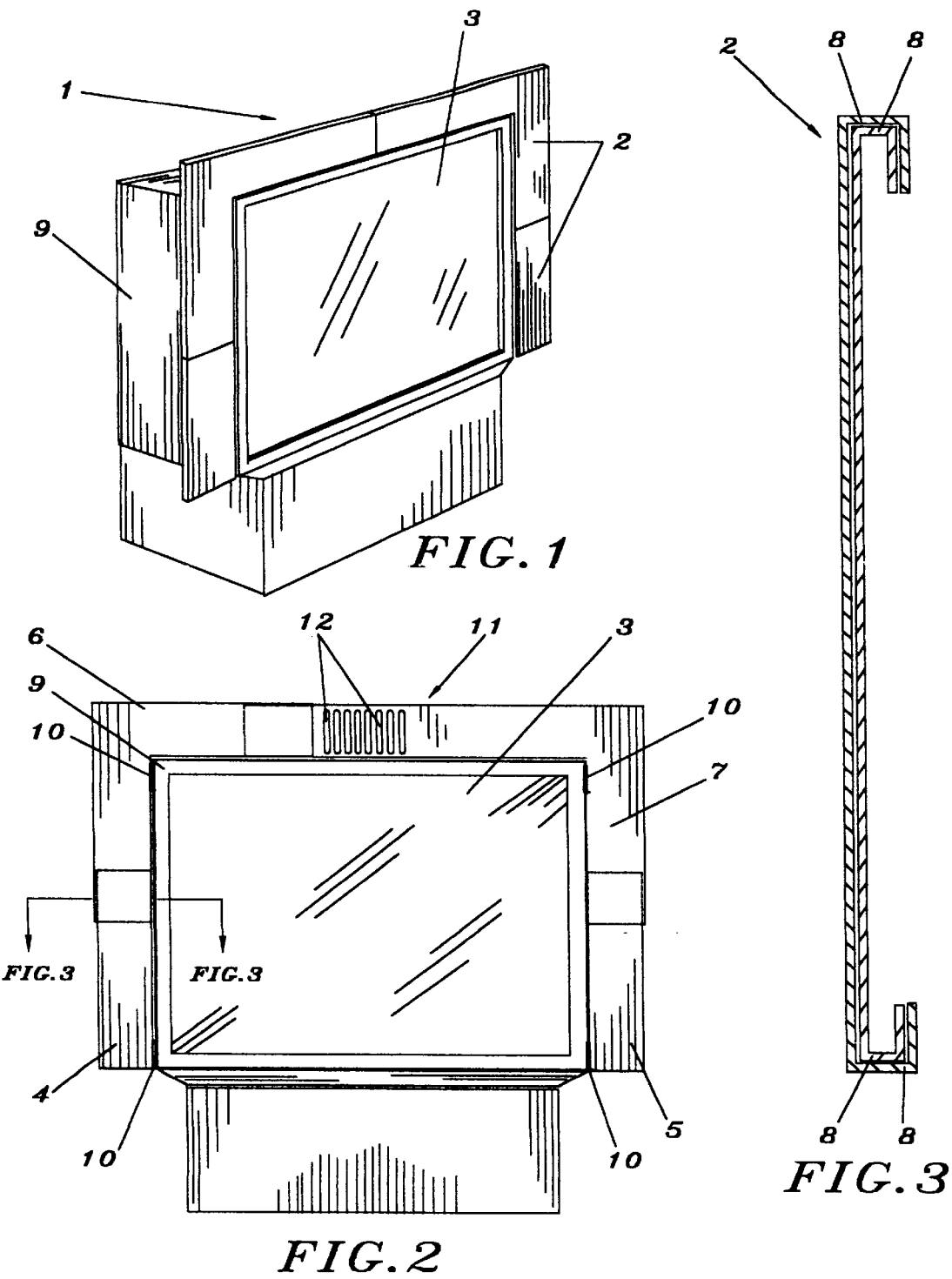

BACKGROUND LIGHT SHIELD FOR A VIDEO DISPLAY

BACKGROUND OF THE INVENTION

1. Field of the Invention

This invention relates to devices used to shield unwanted environmental light from causing glare or other light interference when viewing a video display such as a television. The present invention is a darkened border shield that serves as a frame around a video display such as a television monitor to reduce background brightness around the face of the video display.

2. Description of the Related Art

There are currently in use various devices for shielding video monitors which generally take the form of a hood extending perpendicular away from the plane of the face of the display. These include apparatus made of cardboard, plastic, wood and the like. There are also known cabinets which are constructed such that the video display is contained therein and thus ambient light shielding may be provided.

An example of a simple, attachable hood shield is disclosed in U.S. Pat. No. 4,633,324 which is adjustable to fit various size video displays with an emphasis on the CRT apparatus. A more complicated example of a hood which includes a means to shield out ambient light is found in U.S. Pat. No. 5,485,226. Again it should be emphasized these devices present a hood which projects perpendicular out from the plane of the video screen to form an awning or tubular cover. In such devices the walls may also be flared outwards in some manner.

The present invention is a shielding device that is approximately parallel to the plane of the face of the video screen of a television or other video display device. An interlocking combination of panels is attached around the cabinet structure of the video display. This provides a broad darkened frame around the display to contrast with the light of the display and to reduce ambient background light.

SUMMARY OF THE INVENTION

One object of the present invention is to reduce background brightness around the face of a video display by use of a shield. Another object is to allow adjustment of the size of the shield elements to accommodate differing size video monitors. A further object is accommodation of sound speakers which may be associated with the video monitor.

In accordance with the description presented herein, other objectives of this invention will become apparent when the description and drawings are reviewed.

BRIEF DESCRIPTION OF THE DRAWING

FIG. 1 illustrates a perspective view of the background light shield attached to a large screen television cabinet.

FIG. 2 illustrates a front elevation view of the background light shield attached to a large screen television cabinet.

FIG. 3 illustrates a side cross section view of two slidably engaged background light shield elements.

DESCRIPTION OF THE PREFERRED EMBODIMENT

The background light shield has rectangular panels with overlapping and angled edges which panels may slide relative to each other. The corner panels are a right angle L shape to conform with the cabinet on which to be mounted. Slidably adjusting the panels to the dimensions of the cabinet of the video monitor provides a close fit and appropriate shape. The background light shield is then attached to the cabinet. The panels are dark color and normally rough texture for low light reflectivity.

Referring to FIGS. 1 through 3, the background light shield (1) has four panel elements (2). As viewed at the front of the video display (3) there is a left panel (4) and a right panel (5) both of which are rectangular in shape. They are slidably engaged with a left corner panel (6) and right corner panel (7) respectively which corner panels (6,7) have rectangular leg elements.

The longitudinal edges (8) of the panel elements (2) are formed in an angled U shaped trough configuration as best seen in FIG. 3. Overlapping panel elements (2) are sized such that one panel such as left panel (4) is relatively smaller than left corner panel (6) to allow one to slide into the other. Normally a close or snug fit between panels is use to aid in retaining adjustment position. In the illustration in FIG. 2, the right corner panel (7) slides into the left corner panel (6) and the right panel (5) slides into the right corner panel (7). Rather than angle longitudinal edges (8) the panels may be duct shaped with a rectangular cross section to fit one into the other.

Once the panel elements (2) are slideably adjusted relative to each other for the length and width of the video display cabinet (9) they are fixed by appropriate means such as fasteners, pressure sensitive tape welding or the like. The assembled background light shield (1) is then attached to the video display cabinet (9) by suitable means. One attachment method found appropriate by experiment is the use of hook and loop fasteners (10). This also allows removal for cleaning or other purposes.

As illustrated in FIG. 2 an opening (11) may be provided in a panel element (2) to allow for an audio speaker that rests on top of the video display cabinet (9). This allows the audio sound to be projected toward the viewer and listener without obstruction by the background light shield (1). Obviously openings (11) could be provided at other locations in panel elements (2). The opening (11) is illustrated as a plurality of slit openings (12); however, other forms of openings may be used to suit the taste of the user.

Also if desired an appropriate width background light shield (1) could be used and attached intermediate the front and rear of a video display cabinet (9). This would allow a small audio speaker to be placed in front of the background light shield (1) if so desired.

While the invention has been particularly shown and described with respect to the illustrated and preferred embodiments thereof, it will be understood by those skilled in the art that the foregoing and other changes in form and details may be made therein without departing from the spirit and scope of the invention.

I claim:

1. A device to reduce background ambient light around the periphery and rearward of the face of a video display comprising:

a plurality of rectangular panel elements having width and height dimensions and a thickness in a direction perpendicular to said width and said height dimensions, overlapping portions of adjacent ones of said panel elements slidably engaged with each other in one of a width or height direction by a means for engagement;

said width and height dimensions each greater than said thickness; and the panel elements slidably and adjustably engaged such that they may be fit around and attached to a video display cabinet with the rectangular shapes of said panel elements extending outwardly substantially parrallel to said width and height directions and adapted to be parallel to a video screen face in the video display cabinet.

2. The device as in claim 1 wherein two of the panel elements are formed in the shape of an L.

3. The device as in claim 1 wherein at least one of the panel elements has an aperture defined therein shaped to accommodate a speaker output.

4. The device as in claim 1 where the means to slidably engage is the panel elements formed substantially as ducts having rectangular cross sections with the rectangular cross section size of each panel element allowing telescopic engagement with adjacent panel elements.

5. The device as in claim 1 wherein the means to slidably engage is a plurality of longitudinal edges formed as an angled U shaped trough with the longitudinal edges of each panel element allowing telescopic engagement with adjacent panel element.

6. The device as in claim 1 wherein the panel elements are a dark color and a rough texture.

7. A device to reduce background ambient light around the periphery and rearward of the face of a video display comprising:

a left panel slidably engaged along a vertical longitudinal axis with a left corner panel having an L shape;

a right corner panel having an L shape and slidably engaged with the left corner panel along a horizontal longitudinal axis;

a right panel slidably engaged along a second vertical longitudinal axis with the right corner panel;

a means for attachment on said panels; and the left panel, the right panel, legs of the left corner panel and legs of the right corner panel are each substantially rectangular in shape and extend outwardly substantially parallel to their width and height dimensions and are adapted to be in a plane parallel to a video screen face when attached to a video display cabinet by a said means for attachment, said panels having a thickness in a direction perpendicular to said width and said height, said thickness being less than each of the width and height dimensions.

8. The device as in claim 7 wherein at least one of the left panel, the right panel, the left corner panel and the right corner panel have an opening defined therein shaped to accommodate an audio speaker output.

9. The device as in claim 7 wherein the slidable engagement means is the left panel, the right panel, the left corner panel and the right corner panel formed substantially as ducts having rectangular cross sections with the rectangular cross section size of each panel allowing telescopic mating with adjacent panels.

10. The device as in claim 7 wherein the slidable engagement means is the left panel, the right panel, the left corner panel and the right corner panel on each longitudinal edge formed as an angled U shaped trough with the longitudinal edges of each panel allowing telescopic mating of adjacent panels.

11. The device as in claim 7 wherein the left panel, the right panel, the left corner panel and the right corner panel are a dark color and a rough texture.

* * * * *